United States Patent
Russell et al.

(10) Patent No.: US 12,420,607 B2
(45) Date of Patent: Sep. 23, 2025

(54) METHODS AND APPARATUS TO USE FRONT LOAD ESTIMATES FOR BODY CONTROL

(71) Applicant: Ford Global Technologies, LLC, Dearborn, MI (US)

(72) Inventors: David Michael Russell, Ann Arbor, MI (US); Charles Gavin McGee, Brighton, MI (US); Ben Bulat, Northville, MI (US); Daniel Lee Grohnke, Ann Arbor, MI (US); Darrell Erick Butler, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 18/440,721

(22) Filed: Feb. 13, 2024

(65) Prior Publication Data
US 2024/0181829 A1 Jun. 6, 2024

Related U.S. Application Data

(63) Continuation of application No. 17/489,423, filed on Sep. 29, 2021, now Pat. No. 11,945,277.

(51) Int. Cl.
*B60G 17/018* (2006.01)
*B60G 17/019* (2006.01)

(52) U.S. Cl.
CPC ..... *B60G 17/018* (2013.01); *B60G 17/01933* (2013.01); *B60G 2400/202* (2013.01); *B60G 2400/60* (2013.01)

(58) Field of Classification Search
CPC ............ B60G 17/018; B60G 17/01933; B60G 2400/202; B60G 2400/60
See application file for complete search history.

(56) References Cited

U.S. PATENT DOCUMENTS

| | | | |
|---|---|---|---|
| 5,072,965 A | 12/1991 | Wada et al. |
| 5,086,656 A | 2/1992 | Schwendemann et al. |
| 5,189,615 A | 2/1993 | Rubel et al. |
| 5,488,562 A | 1/1996 | Otterbein et al. |
| 5,526,262 A | 6/1996 | Kimura et al. |
| 5,944,763 A | 8/1999 | Iwasaki |
| 6,026,339 A | 2/2000 | Williams |

(Continued)

FOREIGN PATENT DOCUMENTS

| | | |
|---|---|---|
| CN | 108454343 A | 8/2018 |
| DE | 102008053001 A1 | 10/2009 |

OTHER PUBLICATIONS

United States Patent and Trademark Office, "Notice of Allowance and Fee(s) Due," issued in connection with U.S. Appl. No. 17/489,423, dated Nov. 15, 2023, 8 Pages.

*Primary Examiner* — Phutthiwat Wongwian
(74) *Attorney, Agent, or Firm* — Hanley, Flight & Zimmerman, LLC; Lorne Forsythe

(57) ABSTRACT

Methods, apparatus, systems, and articles of manufacture are disclosed to use front load estimates for body control are disclosed herein. An example vehicle includes a front axle, a suspension system including a suspension element, and a processor to execute instructions to generate, based on a load on the front axle and a velocity of the vehicle, a body control adjustment, determine a modified body control output based on the body control adjustment and an unmodified body control output, and apply the modified body control output to the suspension element of the vehicle.

20 Claims, 7 Drawing Sheets

(56) References Cited

U.S. PATENT DOCUMENTS

| | | |
|---|---|---|
| 6,502,837 B1 | 1/2003 | Hamilton et al. |
| 7,333,882 B2 | 2/2008 | Uchino et al. |
| 7,627,408 B2 | 12/2009 | Kim et al. |
| 7,672,766 B2 | 3/2010 | Poilbout |
| 8,280,585 B2 | 10/2012 | Harder et al. |
| 8,985,594 B2 | 3/2015 | Yabumoto |
| 10,696,121 B2 | 6/2020 | Liebold et al. |
| 10,974,562 B2 | 4/2021 | Paiva et al. |
| 11,945,277 B2 | 4/2024 | Russell et al. |
| 2002/0143448 A1 | 10/2002 | Shal et al. |
| 2007/0296173 A1 | 12/2007 | Regnell et al. |
| 2009/0043451 A1 | 2/2009 | Harder et al. |
| 2012/0041643 A1 | 2/2012 | Proemm et al. |
| 2014/0303844 A1 | 10/2014 | Hoffmann et al. |
| 2014/0316637 A1 | 10/2014 | Rhode et al. |
| 2015/0057885 A1 | 2/2015 | Brady et al. |
| 2016/0107498 A1 | 4/2016 | Yamazaki |
| 2017/0361672 A1 | 12/2017 | Ahmadian |
| 2020/0055363 A1 | 2/2020 | Paiva et al. |
| 2021/0178849 A1 | 6/2021 | Park |
| 2022/0297493 A1 | 9/2022 | Konada et al. |
| 2023/0100724 A1 | 3/2023 | Russell et al. |

METHODS AND APPARATUS TO USE FRONT LOAD ESTIMATES FOR BODY CONTROL

RELATED APPLICATION

This patent arises from a continuation of U.S. patent application Ser. No. 17/489,423, filed on Sep. 29, 2021, and entitled "METHODS AND APPARATUS TO USE FRONT LOAD ESTIMATES FOR BODY CONTROL," the entirety of which is incorporated herein by reference.

FIELD OF THE DISCLOSURE

This disclosure relates generally to vehicle body control systems and, more particularly, to methods and apparatus to use front load estimates for body control.

BACKGROUND

A vehicle typically has automated controllers operable to control various systems (e.g., an anti-lock braking system, a suspension system, etc.) of the vehicle and improve performance during normal vehicle use. Such controllers may be communicatively coupled to sensors (e.g., cameras or optical sensors, tachometers, transducers, etc.) to periodically monitor and detect parameters and/or characteristics associated with the vehicle, such as speed, acceleration, fluid pressure, etc. The use of continuously gathered sensor data enables vehicle controllers to frequently adjust vehicle characteristics during normal operation of the vehicle. In some examples, an electronic control unit (ECU) can advantageously use data from one or more sensor(s) of the vehicle to control the suspension system, which can improve comfort for occupants of the vehicle and improve vehicle performance.

SUMMARY

An example apparatus disclosed herein includes memory including stored instructions, and a processor to execute the instructions to filter sensor data to generate a first load value, the first load value associated with a first load on a front axle of a vehicle, generate, based on the first load value and a velocity of the vehicle, a first body control adjustment value, modify a body control output value with the first body control adjustment value, and apply the modified body control output value to a suspension system of the vehicle.

An non-transitory machine-readable storage medium disclosed herein includes instructions which, when executed, cause a processor to filter sensor data to generate a first load value, the first load value associated with a first load on a front axle of a vehicle, generate, based on the first load value and a velocity of the vehicle, a first body control adjustment value, modify a body control output value with the first body control adjustment value, and apply the modified body control output value to a suspension system of the vehicle.

An example method disclosed herein includes filtering sensor data to generate a first load value, the first load value associated with a first load on a front axle of a vehicle, generating, based on the first load value and a velocity of the vehicle, a first body control adjustment value, modifying a body control output value with the first body control adjustment value, and applying the modified body control output value to a suspension system of the vehicle.

Figure 1:
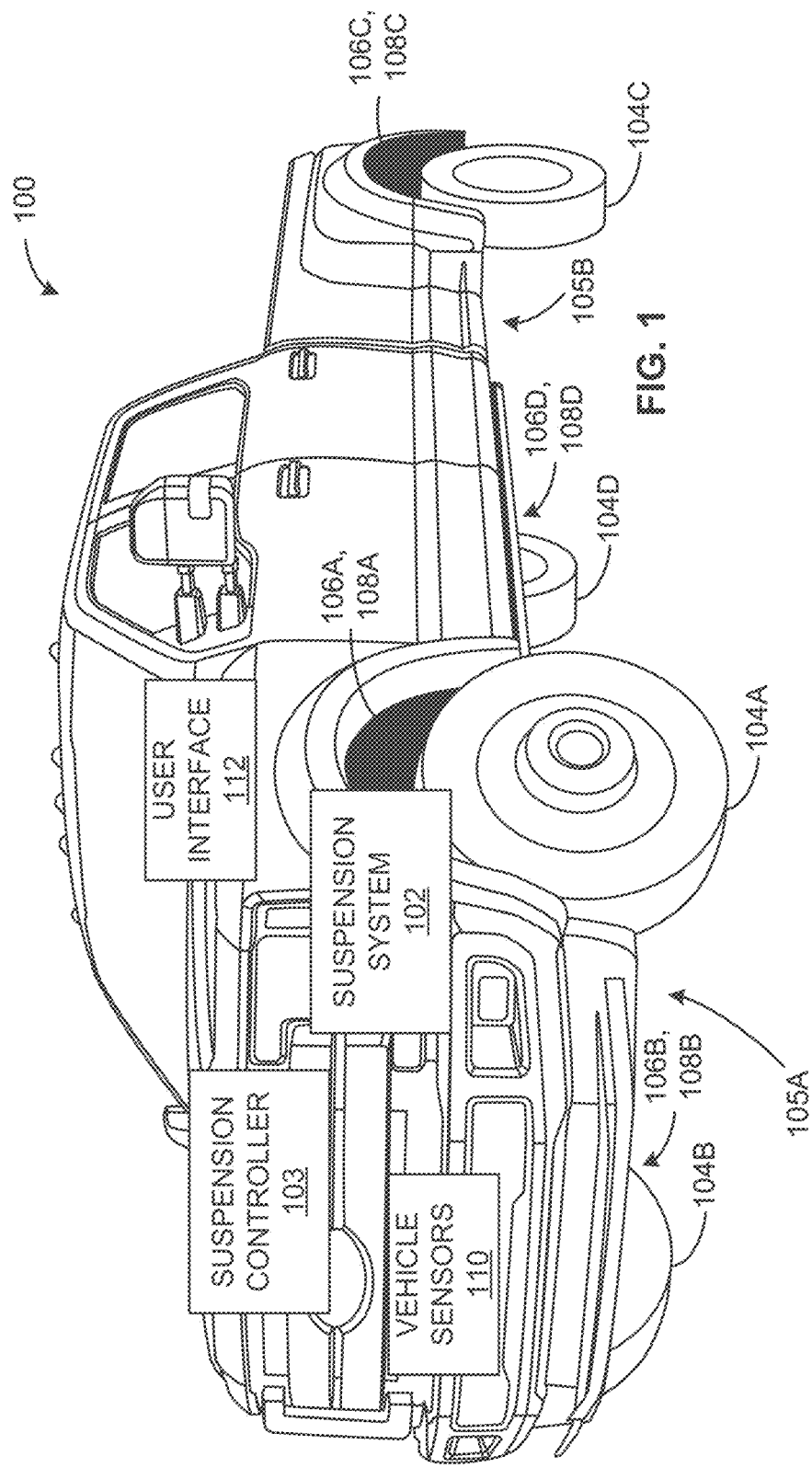
FIG. 1 is a perspective view of a vehicle in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAS, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a heave axis, a pitch axis, and a roll axis of the vehicle associated with the features. As used herein, the longitudinal axis of the vehicle is parallel to a centerline of the vehicle. The terms "rear" and "front" are used to refer to directions along the roll axis closer to the rear of the vehicle and the front of the vehicle, respectively. As used herein, the heave axis of the vehicle is perpendicular to the ground on which the vehicle rests. The terms "below" and "above" are used to refer to directions along the heave axis closer to the ground and further away from the ground, respectively. As used herein, the pitch axis of the vehicle is perpendicular to the roll and heave axes and is generally parallel to the axles of the vehicle. As used herein, the terms "longitudinal," and "axial" are used interchangeably to refer to directions parallel to the roll axis. As used herein, the terms "lateral" and "horizontal" are used to refer to directions parallel to the pitch axis. As used herein, the term "vertical" is used to refer to directions parallel to the heave axis.

Many vehicles include semi-active suspension systems, which control the damping force of the suspension elements of the vehicle (e.g., shock absorbers, etc.) in response to the condition of the vehicle (e.g., vehicle dynamics, driving surface properties, etc.). Semi-active suspension systems are often tuned to mimic the function of active suspension systems, which directly control the relative movement of the wheels of the vehicle and the chassis of the vehicle. Semi-active suspension systems generally work by continuously changing the viscous damping coefficient of suspension elements of a suspension system based on sensor data of the vehicle. Semi-active suspension systems can be implemented with different control methodologies including, for example, Skyhook control theory. Body control of vehicles is often controlled using semi-active suspension systems.

Due to varying loads on the rear axle of vehicles (e.g., variable amounts of rear passengers, variable contents of a truck, etc.), some vehicles with semi-active suspension systems factor rear axle loading into damping commands for a suspension system of a vehicle. In recent years, due to developments in pick-up trucks and electric vehicles, vehicles have had an increased likelihood to have variable loads on the front axle. For example, electric vehicles often include front trunks, which can be variably loaded. Similarly, trucks can have plows and other equipment coupled to the front of the vehicle. These additions can change a vehicle's pitch inertia and load distribution, thereby affecting the body control of the vehicle. As such, there is an increasing need to factor front load variations into vehicle body control.

Examples disclosed herein use front load estimates in body control calculations for semi-active suspension systems. In some examples disclosed herein, the viscous damping coefficients of a suspension system of a vehicle are determined based on front load estimates, rear load estimates, vehicle sprung velocity, and acceleration demands from a user of the vehicle. In some examples disclosed herein, front load estimates and rear load estimates are determined based on sensor data from ride height sensors associated with each one of the wheels of the vehicle. In some examples disclosed herein, an unmodified body control output is determined based on conventional body theories and vehicle dynamics. Examples disclosed herein improve user experience by tuning body control over a greater range of vehicle load(s) and load distribution(s).

FIG. 1 is a perspective view of an example vehicle 100 in which examples disclosed herein can be implemented. In the illustrated example of FIG. 1, the vehicle 100 includes an example suspension system 102, an example suspension controller 103, an example first wheel 104A, an example second wheel 104B, an example third wheel 104C, an example fourth wheel 104D, an example first axle 105A, and an example second axle 105B. In the illustrated example of FIG. 1, the first wheel 104A has a corresponding example first suspension element 106A and example first suspension-based sensor(s) 108A. In the illustrated example of FIG. 1, the second wheel 104B has a corresponding example second suspension element 106B and example second suspension-based sensor(s) 108B. In the illustrated example of FIG. 1, the third wheel 104C has a corresponding example third suspension element 106C and example third suspension-based sensor(s) 108C. In the illustrated example of FIG. 1, the fourth wheel 104D has a corresponding example fourth suspension element 106D and example fourth suspension-based sensor(s) 108D. In the illustrated example of FIG. 1, the vehicle 100 includes example vehicle sensors 110 and an example user interface 112.

The vehicle 100 is a motorized wheel-driven vehicle. In the illustrated example of FIG. 1, the vehicle 100 is a pick-up truck. In other examples, the vehicle 100 can be any type of vehicle with brakes (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle.

The suspension system 102 is a semi-active suspension system and includes the suspension elements 106A, 106B, 106C, 106D with adjustable damping properties. The suspension system 102 can include an independent suspension (e.g., a wishbone suspension, etc.), a solid axle suspension (e.g., a leaf spring suspension, etc.) or a combination thereof (e.g., an independent suspension for the first axle 105A, a rear axle dependent suspension for the second axle 105B, etc.).

The suspension controller 103 controls the operation of the suspension system 102. For example, the suspension controller 103 can, based on sensor data received from the sensors 108A, 108B, 108C, 108D, 110, determine a load on each of the axles 105A, 105B. In some examples, the suspension controller 103 can determine a front load value based on the load on the first axle 105A and a rear load value based on the load on the second axle 105B. In some examples, the suspension controller 103 can, via a lookup table, determine one or more body control modification(s) (e.g., a damping coefficient modification to the suspension elements 106A, 106B, 106C, 106D, etc.) based on front load sensor data, rear load sensor data, and vehicle dynamics. In such examples, the suspension controller 103 can modify an unmodified body control output (e.g., generated using Skyhook control theories, etc.) with the determined body control modification. In some examples, the suspension controller 103 can correspondingly adjust the damping elements of the suspension elements 106A, 106B, 106C, 106D.

The wheels 104A, 104B, 104C, 104D include a wheel rim and a corresponding tire. While in the illustrated example of FIG. 1, the vehicle 100 has two axles and four wheels, in other examples, the vehicle 100 can have any number of axles and wheels. In the illustrated example of FIG. 1, the first wheel 104A and the second wheel 104B are front wheels coupled via the first axle 105A (e.g., the front axle, etc.). In the illustrated example of FIG. 1, the third wheel 104C and the fourth wheel 104D are rear wheels coupled via the second axle 105B (e.g., the rear axle, etc.). In the illustrated example of FIG. 1, the first wheel 104A and the third wheel 104C are driver-side wheels and the second wheel 104B and the fourth wheel 104D are passenger-side wheels.

The suspension elements 106A, 106B, 106C, 106D are the damping and spring elements of the suspension system 102 associated with the corresponding ones of the wheels 104A, 104B, 104C, 104D. For example, each of the suspension elements 106A, 106B, 106C, 106D can include an elastic element (e.g., a leaf spring, a torsion bar, a coil spring, a bushing, an air spring, an oleo strut, a hydropneumatic spring, etc.) and a damping element (e.g., a twin-tubed shock absorber, a mono-tube shock absorber, a spool valve, etc.). In the illustrated example of FIG. 1, the viscous damping coefficient associated with each of the suspension elements 106A, 106B, 106C, 106D can be individually controlled via the suspension controller 103. In other examples, only some of the suspension elements 106A, 106B, 106C, 106D can include adjustable damping elements (e.g., the front suspension elements 106A, 106B, the rear suspension elements 106C, 106D, etc.). For example, the suspension controller 103 can mechanically (e.g., via a valve, etc.) alter the flow of the hydraulic and/or pneumatic mediums of the suspension elements 106A, 106B, 106C, 106D to change the viscous damping coefficient(s) of the suspension elements 106A, 106B, 106C, 106D. Additionally or alternatively, if the damping medium of the suspension elements 106A, 106B, 106C, 106D is a magnetorheological fluid, the suspension controller 103 can change the viscous damping coefficient(s) of the suspension elements 106A, 106B, 106C, 106D via an electromagnet. In other examples, the suspension controller 103 can alter the damping characteristics of the suspension system 102 by any other suitable means.

As used herein, the "sprung mass" of the vehicle 100 refers to the portion of the mass of the vehicle 100 supported by the suspension elements 106A, 106B, 106C, 106D. The sprung mass of the vehicle 100 is the portion of the vehicle 100 that does not include the mass of the wheels 102A, 102B, 102C, 102D, the suspension elements 106A, 106B, 106C, 106D, the axles 105A, 105B and the other elements of the vehicle 100 not supported by the suspension elements 106A, 106B, 106C, 106D. As used herein, the "sprung mass velocity" refers to the velocity of the center of mass of the sprung mass of the vehicle 100. The sprung mass velocity can be expressed in absolute terms (e.g., relative to the stationary frame, etc.) or relative terms (e.g., relative to the overall velocity of the vehicle 100, etc.). The sprung mass velocity can also be expressed in components in the heave direction, the pitch direction, and the roll direction.

The suspension-based sensors 108A, 108B, 108C, 108D are sensors that are disposed on components of the suspension system 102 (e.g., corresponding ones of the suspension elements 106A, 106B, 106C, 106D, etc.) and are associated with the respective ones of the wheels 102A, 102B, 102C, 102D to measure characteristics associated with the wheels 102A, 102B, 102C, 102D and/or the suspension elements 106A, 106B, 106C, 106D. For example, the suspension-based sensors 108A, 108B, 108C, 108D can be ride height sensors that measure the compression of corresponding ones of the suspension elements 106A, 106B, 106C, 106D. In some examples, the suspension controller 103 can use data from the suspension-based sensors 108A, 108B, 108C, 108D to determine the load on the corresponding ones of the suspension-based sensors 108A, 108B, 108C, 108D. In other examples, the suspension-based sensors 108A, 108B, 108C, 108D can include any other sensors associated with the weight of the vehicle 100 (e.g., a tire pressure sensor, a strain gauge, an optical sensor, suspension displacement sensors, suspension force sensors, etc.). Additionally or alternatively, the suspension-based sensors 108A, 108B, 108C, 108D can include any other sensors (e.g., temperature sensors, a potentiometer, an optical sensor, etc.). In some examples, the suspension-based sensors 108A, 108B, 108C, 108D can be absent and/or not used to determine the load on the corresponding ones of the wheels 102A, 102B, 102C, 102D. In some such examples, the vehicle sensors 110 can be used to determine the weight of the vehicle 100 (e.g., one or more sensor(s) disposed on the axles 105A, 105B, etc.).

The vehicle sensors 110 measure the properties of the vehicle 100. In the illustrated example of FIG. 1, the vehicle sensors 110 include one or more velocity sensor(s) (e.g., a piezoelectric sensor(s), an optical sensor(s), a mechanical sensor(s), a Hall-effect sensor(s), etc.). In some examples, the vehicle sensors 110 can measure one or more velocities of the sprung mass of the vehicle 100 (e.g., a heave velocity of the sprung mass, a pitch velocity of the sprung mass, a roll velocity of the sprung mass, etc.) Additionally or alternatively, the vehicle sensors 110 can include one or more accelerometers. In such examples, the suspension controller 103 can estimate the sprung mass velocity of the vehicle 100 based on sensor data from the accelerometers. In other examples, the vehicle sensors 110 can include any suitable sensors. In some examples, the vehicle sensors 110 can be part of another system of the vehicle 100 (e.g., a safety system of the vehicle 100, etc.).

The user interface 112 enables a user of the vehicle 100 to receive information from the user and input information to the suspension controller 103 and other systems of the vehicle 100. For example, the user interface 112 can include a display of the vehicle 100. In some examples, the user interface 112 can include an interface to operate the suspension controller 103 during operation of the vehicle 100 (e.g., a dial, a button, etc.). In some examples, the user interface 112 can receive an instruction from a user of the vehicle 100 to change a damping characteristic of the suspension elements 106A, 106B, 106C, 106D (e.g., to change a tuning preference of the suspension elements 106A, 106B, 106C, 106D, etc.). Additionally or alternatively, the user interface 112 can include one or more dash indicator(s), one or more button(s) on the dashboard or steering wheel, one or more speakers, one or more microphones, etc. In some examples, the user interface 112 can be fully or partially implemented by a mobile device of the user (e.g., a mobile phone, a smartwatch, a tablet, etc.).

Figure 2:
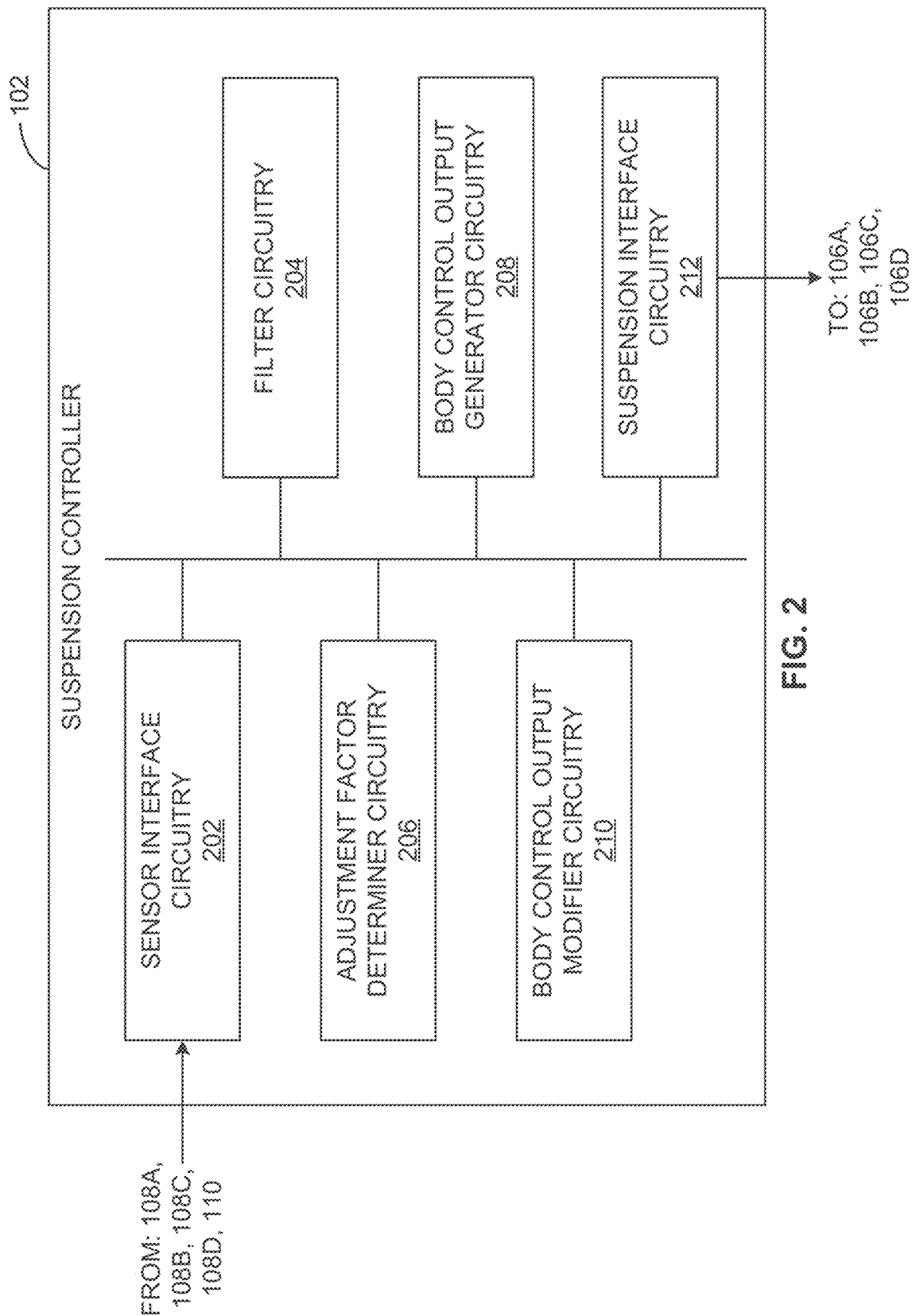
FIG. 2 is a block diagram of the suspension controller of FIG. 1.

FIG. 2 is a block diagram of the suspension controller 103 of FIG. 1. In the illustrated example of FIG. 1, the suspension controller 103 includes example sensor interface circuitry 202, example filter circuitry 204, example adjustment factor determiner circuitry 206, example body control output generator circuitry 208, example body control output modifier circuitry 210, and example suspension interface circuitry 212.

The sensor interface circuitry 202 receives sensor data from the sensors 108A, 108B, 108C, 108D, 110 of the example vehicle 100. For example, the sensor interface circuitry 202 can receive data regarding the weight of the vehicle 100 (e.g., from the suspension-base sensors 108A, 108B, 108C, 108D, etc.) and/or vehicle sprung mass velocity (e.g., from the vehicle sensors 110, etc.) In some examples, the sensor interface circuitry 202 can transform the received sensor data from a machine-readable format (e.g., a voltage, a current, etc.) to a human-readable format (e.g., a string, a floating-point number, an integer, etc.).

The filter circuitry 204 smooths and/or filters the sensor data accessed by the sensor interface circuitry 202. For example, the filter circuitry 204 can smooth the sensor data to remove small fluctuations in the sensor data (e.g., noise from the sensor, noise from minor variations in vehicle condition, etc.) to determine load values for the first axle 105A and the second axle 105B. In some examples, the filter circuitry 204 removes noise and/or brief fluctuations in the data. In some examples, the filter circuitry 204 can be implemented by a low-pass filter. In other examples, the filter circuitry 204 can be implemented by any other suitable type of hardware and/or software filter (e.g., a Butterworth filter, a Chebyshev filter, an elliptic filter, a Kalman filter, a kernel smoother, a Kolmogorov-Zurbenko filter, a Loess filter, a moving average filter, a Savitzky-Golay filter, etc.). In other examples, the filter circuitry 204 can be absent. In such examples, the adjustment factor determiner circuitry 206 can generate the adjustment factor directly from the accessed sensor data.

The adjustment factor determiner circuitry 206 determines the adjustment factor based on the values generated by the filter circuitry 204 and the sprung mass of the vehicle 100. The adjustment factor determiner circuitry 206 determines an adjustment factor for both the load on the first axle 105A and the load on the second axle 105B. For example, the adjustment factor determiner circuitry 206 can determine the adjustment factor(s) using a look-up table using the sprung mass velocity and the values. In some examples, the sprung mass velocity is input into the look-up table as directional components (e.g., sprung mass velocity in the heave direction, sprung mass velocity in the pitch direction, sprung mass in the roll direction, etc.). In some examples, the look-up table(s) used by the adjustment factor determiner circuitry 206 can be populated (e.g., generated, etc.) empirically. Additionally or alternatively, the look-up table(s) used by the adjustment factor determiner circuitry 206 can be populated based on a tuning preference of a user (e.g., input via the user interface 112, etc.). For example, if the vehicle 100 is set to a sport mode (e.g., a performance mode, etc.), the look-up table can be populated with values which cause the suspension elements 106A, 106B, 106C, 106D to behave in a way conducive to performance driving (e.g., stiffer springs, more damping, etc.). In other examples, the vehicle 100 can be set to a comfort mode and the look-up table can be populated with values which cause the suspension elements 106A, 106B, 106C, 106D to behave in a way conducive to casual driving (e.g., softer suspension, less damping, etc.).

The body controller output generator circuitry 208 generates the unmodified output of the body control system for the suspension system 102. For example, the body controller output generator circuitry 208 can generate an unmodified control body control output based on the accessed sensor data (e.g., based on vehicle dynamics and road characteristics, etc.) In some examples, the body controller output generator circuitry 208 can generate an output based on one or more known control methodologies (e.g., Skyhook control theory, etc.). In some examples, the body controller output generator circuitry 208 generates a damping command for each of the suspension elements 106A, 106B, 106C, 106D.

The body control output modifier circuitry 210 modifies the unmodified control output based on the adjustment factors determined by the adjustment factor determiner circuitry 206. For example, the body control output modifier circuitry 210 can multiply the output of the body controller output generator circuitry 208 by each of the adjustment factors determined by the adjustment factor determiner circuitry 206. In other examples, the body control output modifier circuitry 210 can weigh the adjustment factors (e.g., apply a different weight to the front load adjustment factor and the rear load adjustment factor, etc.). For example, the body control output modifier circuitry 210 can apply a different weight to the determined adjustment factors for each of the suspension elements 106A, 106B, 106C, 106D.

The suspension interface circuitry 212 applies the modified body control output to the suspension elements 106A, 106B, 106C, 106D. For example, the suspension interface circuitry 212 can cause the viscous damping coefficient of a damping element of each of the suspension elements 106A, 106B, 106C, 106D to change in value. For example, the suspension interface circuitry 212 can interact with one or more electromagnet(s) and/or valve(s) associated with the suspension elements 106A, 106B, 106C, 106D to change corresponding damping coefficient(s).

While an example manner of implementing the suspension controller 103 of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface circuitry 202, the example filter circuitry 204, the example adjustment factor determiner circuitry 206, the example body controller output generator circuitry 208, the example body control output modifier circuitry 210, the example suspension interface circuitry 212, and/or, more generally, the example suspension controller 103 of FIG. 1, may be implemented by hardware, software, firmware, and/or any combination of hardware, software, and/or firmware. Thus, for example, any of the example sensor interface circuitry 202, the example filter circuitry 204, the example adjustment factor determiner circuitry 206, the example body controller output generator circuitry 208, the example body control output modifier circuitry 210, the example suspension interface circuitry 212, and/or, more generally, the example suspension controller 103 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example sensor interface circuitry 202, the example filter circuitry 204, the example adjustment factor determiner circuitry 206, the example body controller output generator circuitry 208, the example body control output modifier circuitry 210, the example suspension interface circuitry 212 is/are hereby expressly defined to include a non-transitory computer readable storage device or storage disk such as a memory, a digital versatile disk (DVD), a compact disk (CD), a Blu-ray disk, etc., including the software and/or firmware. Further still, the example suspension controller 103 of FIG. 1 may include one or more elements, processes, and/or devices in addition to, or instead of, those illustrated in FIG. 2, and/or may include more than one of any or all of the illustrated elements, processes and devices.

Figure 3:
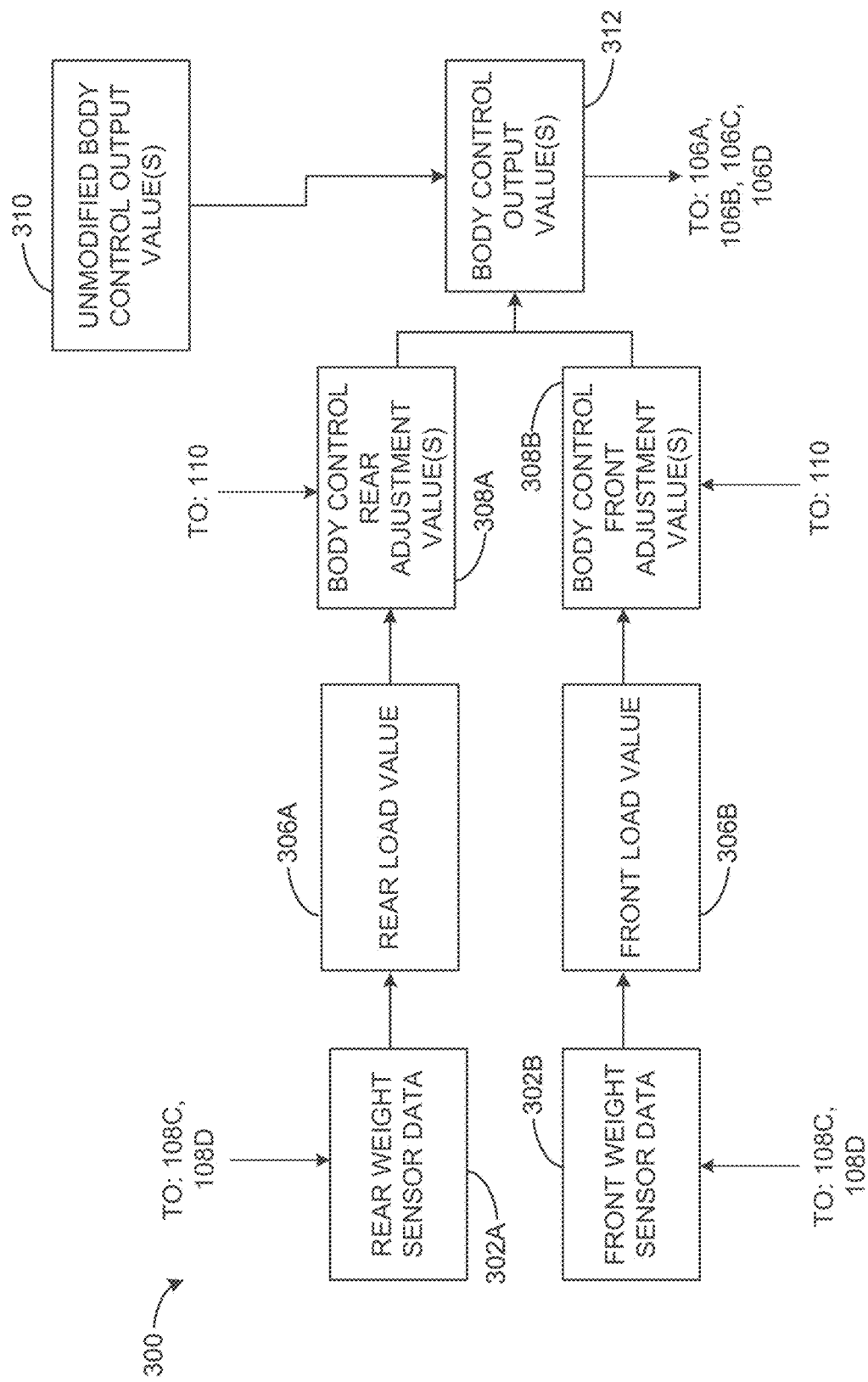
FIG. 3 is a process flow diagram that can be used in conjunction with the suspension controller of FIG. 1.

FIG. 3 is a process flow diagram 300 that can be used in conjunction with the suspension controller 103 of FIG. 1. In the illustrated example of FIG. 3, the diagram 300 includes example rear weight sensor data 302A, example front weight sensor data 302B, an example rear load value 306A, an example front load value 306B, example body control rear adjustment value(s) 308A, example body control front adjustment value(s) 308B, example unmodified body control output value(s) 310, and an example body control output value(s) 312.

During the operation of the suspension controller 103, the rear weight sensor data 302A and the front weight sensor data 302B is collected from the sensors 108A, 108B, 108C, 108D, 110. For example, the suspension controller 103 can collect the rear weight sensor data 302A from the rear suspension-based sensors 108C, 108D and can collect the front weight sensor data 302B from the front suspension-based sensors 108A, 108B. In other examples, the weight sensor data 302A, 302B can be collected from any other suitable sensors.

In the illustrated example of FIG. 3, the weight sensor data 302A, 302B is filtered and/or smoothed to generate the load values 306A, 306B. For example, because the weight sensor data 302A, 302B is collected directly from the sensors of the vehicle 100, the weight sensor data 302A, 302B can be relatively noisy due to minor variations in the condition of the vehicle 100 and/or the sensor error.

In the illustrated example of FIG. 3, the body control adjustment values 308A, 308B are determined based on the load values 306A, 306B, respectively. For example, the body control rear adjustment value(s) 308A can be generated via a look-up table based on the rear weight sensor data 302A and a sprung mass velocity of the vehicle 100 (e.g., collected by the vehicle sensors 110, etc.). In some examples, multiple body control rear adjustment value(s) 308A can be generated corresponding to sprung mass velocity in each component direction (e.g., the heave axis, the roll axis, the pitch axis, etc.). In other examples, a single body control rear adjustment value 308A can be calculated based on the overall sprung mass velocity of the vehicle 100. The body control front adjustment factor(s) 308B can be generated via a look-up table based on the front weight sensor data 302B and a sprung mass velocity of the vehicle 100 (e.g., collected by the vehicle sensors 110, etc.). In some examples, multiple body control front adjustment factor(s) 308B can be generated corresponding to sprung mass velocity in each direction (e.g., the heave axis, roll axis, pitch axis, etc.). In other examples, a single body control front adjustment value 308B can be calculated based on the overall sprung mass velocity of the vehicle 100. In some examples, the look-up tables used to generate the body control adjustment values 308A, 308B are non-linear look-up tables (e.g., a linear change in the magnitude of the load values 306A, 306B does not yield a linear change in body control adjustment values 308A, 308B, etc.). For example, the load values 306A, 306B and the body control adjustment value(s) 308A, 308B have a non-linear relationship, respectively. In some examples, the look-up table is generated empirically (e.g., manually based on testing, etc.). In other examples, the look tables used to generate the body control adjustment values 308A, 308B can be generated by any other suitable means. In some examples, the load values 306A, 306B are not generated. In some such examples, the body control adjustment values 308A, 308B are calculated directly from the weight sensor data 302A, 302B.

The unmodified body control output value(s) 310 is the unmodified output of the suspension controller 103 used to modify the damping commands of the suspension elements 106A. 106B, 106C, 106D. For example, the unmodified body control output value(s) 310 can be generated in accordance with conventional body control theories (e.g., Skyhook control theory, etc.). In some examples, the unmodified body control output value(s) 310 is generated based on the vehicle dynamics and/or a user command (e.g., an acceleration command, a declaration command, etc.). In the illustrated example of FIG. 3, the final body control output value(s) 312 is generated based on the unmodified body control output value(s) 310 and the body control adjustment values 308A, 308B. For example, each of the unmodified body control output value(s) 310 can be multiplied by the body control adjustment values 308A, 308B. In other examples, the final body control output value(s) 312 can be generated based on any other suitable means. In the illustrated example of FIG. 3, the final body control output(s) 312 are used to modify the viscous damping coefficient of the suspension elements 106A. 106B, 106C, 106D.

A flowchart representative of example hardware logic circuitry, machine readable instructions, hardware implemented state machines, and/or any combination thereof for implementing the suspension controller 103 of FIG. 1 is shown in FIG. 2. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example a suspension controller 103 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
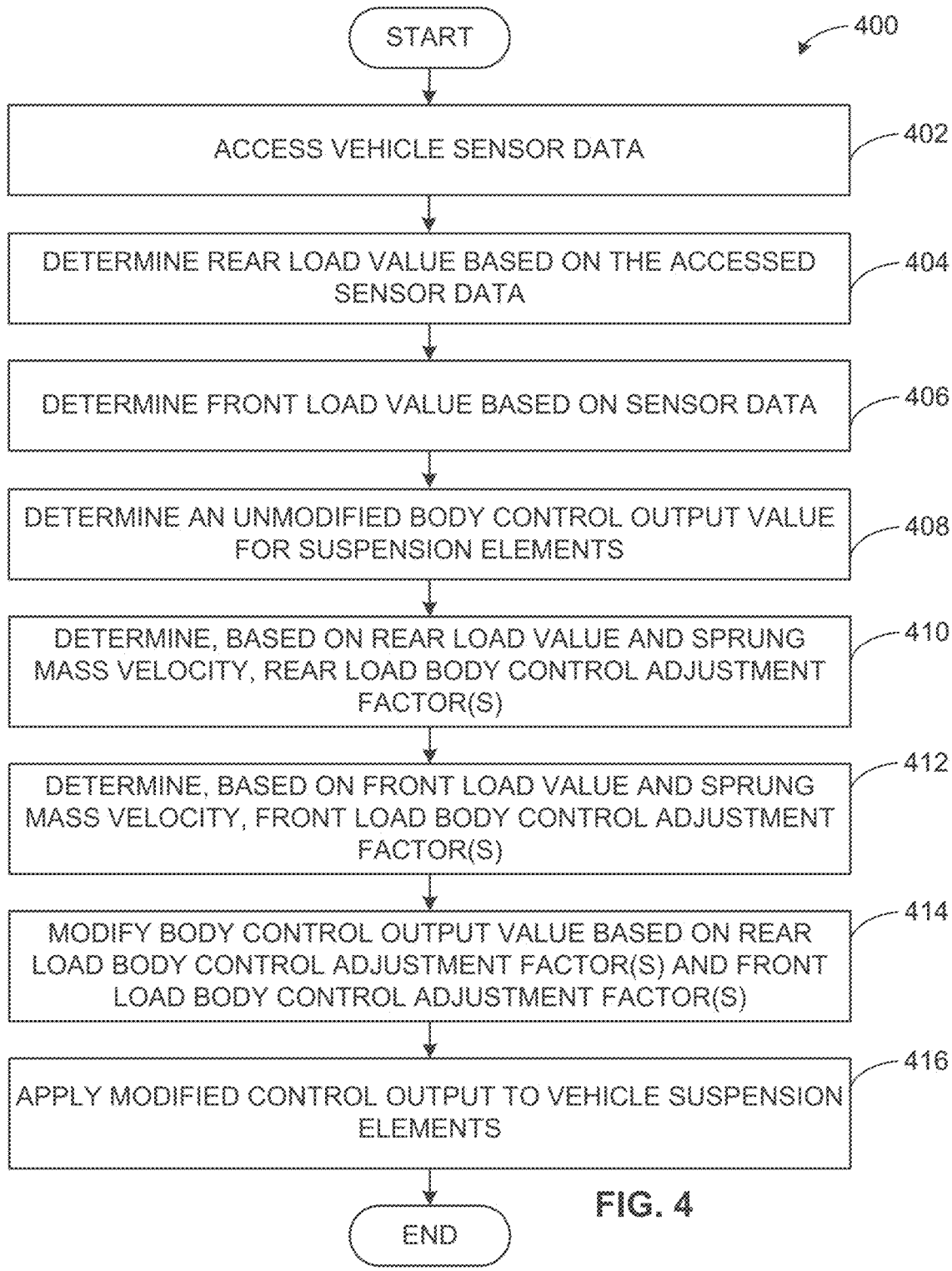
FIG. 4 is a flowchart representative of example machine readable instructions that may be executed by example processor circuitry to implement the suspension controller of FIGS. 1 and 2.

FIG. 4 is a flowchart representative of example machine readable instructions and/or example operations 400 that may be executed and/or instantiated by processor circuitry to use read load estimates to modify body control of the vehicle 100. The machine readable instructions and/or operations 400 of FIG. 4 begin at block 402, at which the sensor interface circuitry 202 receives vehicle sensor data. For example, the sensor interface circuitry 202 can receive data regarding the weight of the vehicle 100 (e.g., from the suspension-base sensors 108A, 108B, 108C, 108D, etc.) and/or vehicle velocity (e.g., from the vehicle sensors 110, etc.) In some examples, the sensor interface circuitry 202 can transform the received sensor data from a machine-readable format (e.g., a voltage, a current, etc.) to a human-readable format (e.g., a string, a floating-point number, an integer, etc.).

At block 404, the filter circuitry 204 determines the rear load value based on the filtered sensor data. For example, the filter circuitry 204 can smooth the sensor data accessed by the sensor interface circuitry 202 to generate the rear load value. For example, the filter circuitry 204 can smooth the sensor data to remove small fluctuations in the sensor data (e.g., noise from the sensor error, noise from minor variations in vehicle condition, etc.) to determine smooth load values for the second axle 105B.

At block 406, the filter circuitry 204 determines the front load value based on the filtered sensor data. For example, the filter circuitry 204 can smooth the sensor data accessed by the sensor interface circuitry 202 to generate the front load value. For example, the filter circuitry 204 can smooth the sensor data to remove small fluctuations in the sensor data (e.g., noise from the sensor error, noise from minor variations in vehicle condition, etc.) to determine a load value for the first axle 105A.

At block 408, the body control output generator circuitry 208 determines the unmodified body control output for the suspension elements 106A, 106B, 106C, 106D. For example, the body controller output generator circuitry 208 can generate an unmodified control body control output based on the accessed sensor data (e.g., based on vehicle dynamics and road characteristics, etc.) In some examples, the body controller output generator circuitry 208 can generate an output based on one or more conventional control methodologies (e.g., Skyhook control theory, etc.). In some examples, the body controller output generator circuitry 208 generates a damping command for each for suspension elements 106A, 106B, 106C, 106D.

At block 410, the adjustment factor determiner circuitry 206 determines, based on the rear load value and sprung mass velocity, the rear load body control adjustment value. For example, the adjustment factor determiner circuitry 206 can determine the rear load adjustment factor using a look-up table using the sprung mass velocity and the rear load values generated during the execution of block 404. In some examples, the sprung mass velocity is input into the look-up table as components (e.g., sprung mass velocity in the heave direction, sprung mass velocity in the pitch direction, sprung mass in the roll direction, etc.). In some examples, the adjustment factor determiner circuitry 206 determines a single adjustment factor for the rear axle load. In other examples, the adjustment factor determiner circuitry 206 determines an adjustment factor for the rear axle load for each of the axes (e.g., the heave axis, the pitch axis, the roll axis, etc.) of the vehicle 100.

At block 412, the adjustment factor determiner circuitry 206 determines, based on the front load value and sprung mass velocity, the front load body control adjustment value. For example, the adjustment factor determiner circuitry 206 can determine the front load adjustment factor using a look-up table using the sprung mass velocity and the front load values generated during the execution of block 406. In some examples, the sprung mass velocity is input into the look-up table as components (e.g., sprung mass velocity in the heave direction, sprung mass velocity in the pitch direction, sprung mass in the roll direction, etc.). In some examples, the adjustment factor determiner circuitry 206 determines a single adjustment factor for the front axle load. In other examples, the adjustment factor determiner circuitry 206 determines an adjustment factor for the front axle load for each of the axes (e.g., the heave axis, the pitch axis, the roll axis, etc.) of the vehicle 100.

At block 414, the body control output modifier circuitry 210 modifies the body control output based on the rear body control adjustment value(s) and front load body control adjustment value(s). For example, the body control output modifier circuitry 210 can multiply the damping command generated by the body control output generator circuitry 208 during the execution of block 408 by the generated rear body control adjustment value(s) and front load body control adjustment value(s). In some examples, the body control output modifier circuitry 210 can weight the rear body control adjustment value(s) and/or front load body control adjustment value(s) (e.g., multiply by a weighing factor, etc.) based on a vehicle condition, a user setting, a manufacturing setting, etc. In some such examples, the body control output modifier circuitry 210 can apply a different weighing factor for the damping commands associated with ones of the suspension elements 106A, 106B, 106C, 106D.

At block 416, the body control output modifier circuitry 210 modifies the body control output based on the rear body control adjustment value(s) and front load body control adjustment value(s). For example, the suspension interface circuitry 212 can cause the viscous damping coefficient of a damping element of each of the suspension elements 106A, 106B, 106C, 106D to change a value. For example, the suspension interface circuitry 212 can cause one or more electromagnet(s) and/or valve(s) associated with the suspension elements 106A, 106B, 106C, 106D. The operations 400 ends.

Figure 5:
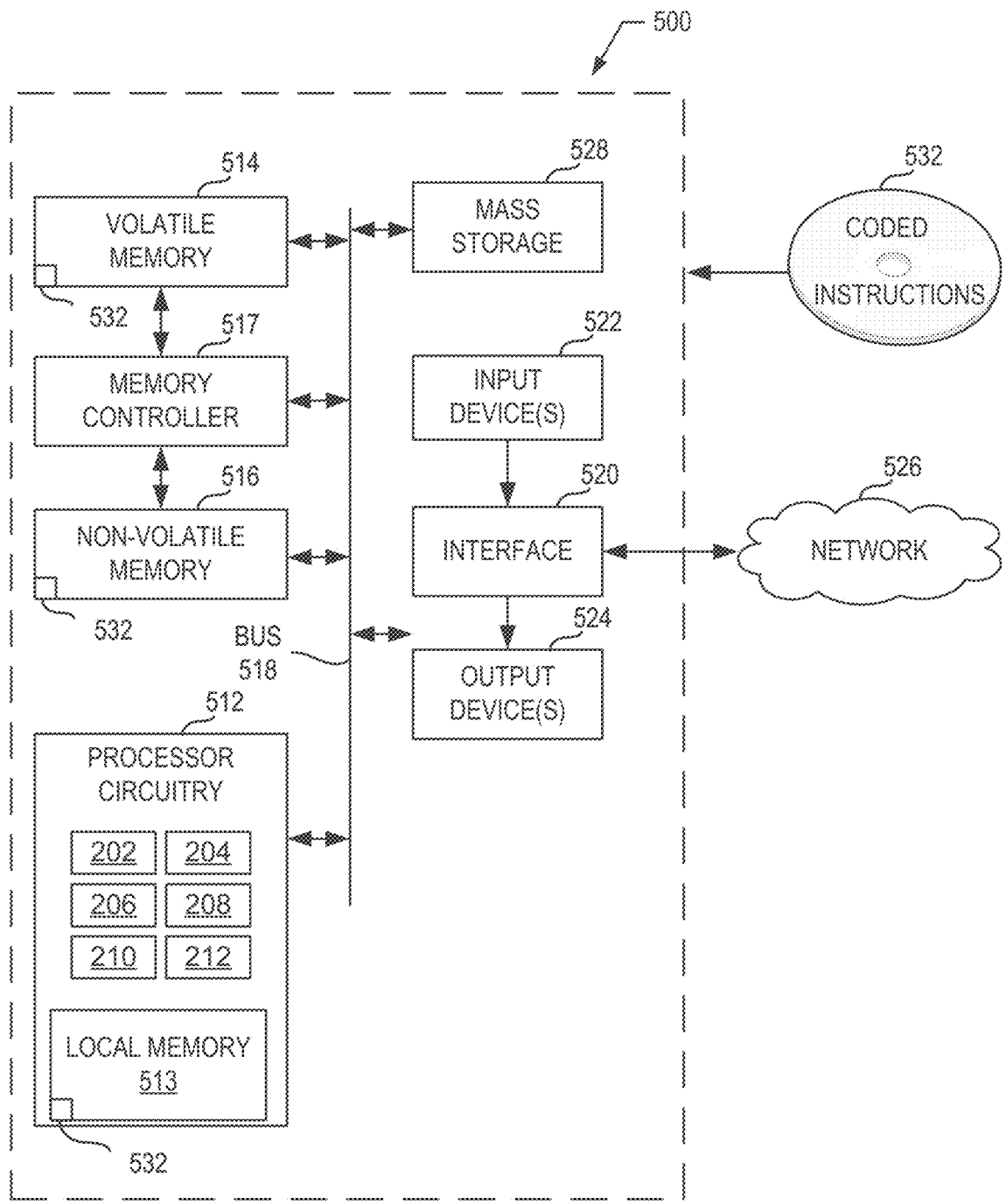
FIG. 5 is a block diagram of an example processing platform including processor circuitry structured to execute the example machine readable instructions of FIG. 3 to implement the suspension controller of FIGS. 1 and 2.

FIG. 5 is a block diagram of an example processor platform 500 structured to execute and/or instantiate the machine readable instructions and/or operations of FIG. 4 to implement the suspension controller 103 of FIGS. 1 and 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a Blu-ray player, a gaming console, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the sensor interface circuitry 202, the filter circuitry 204, the adjustment factor determiner circuitry 206, the body control output generator circuitry 208, the body control output modifier circuitry 210 and the suspension interface circuitry 212.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output devices 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 532, which may be implemented by the machine readable instructions of FIG. 4, may be stored in the mass storage device 528, in the volatile memory 514, in the non-volatile memory 516, and/or on a removable non-transitory computer readable storage medium such as a CD or DVD.

Figure 6:
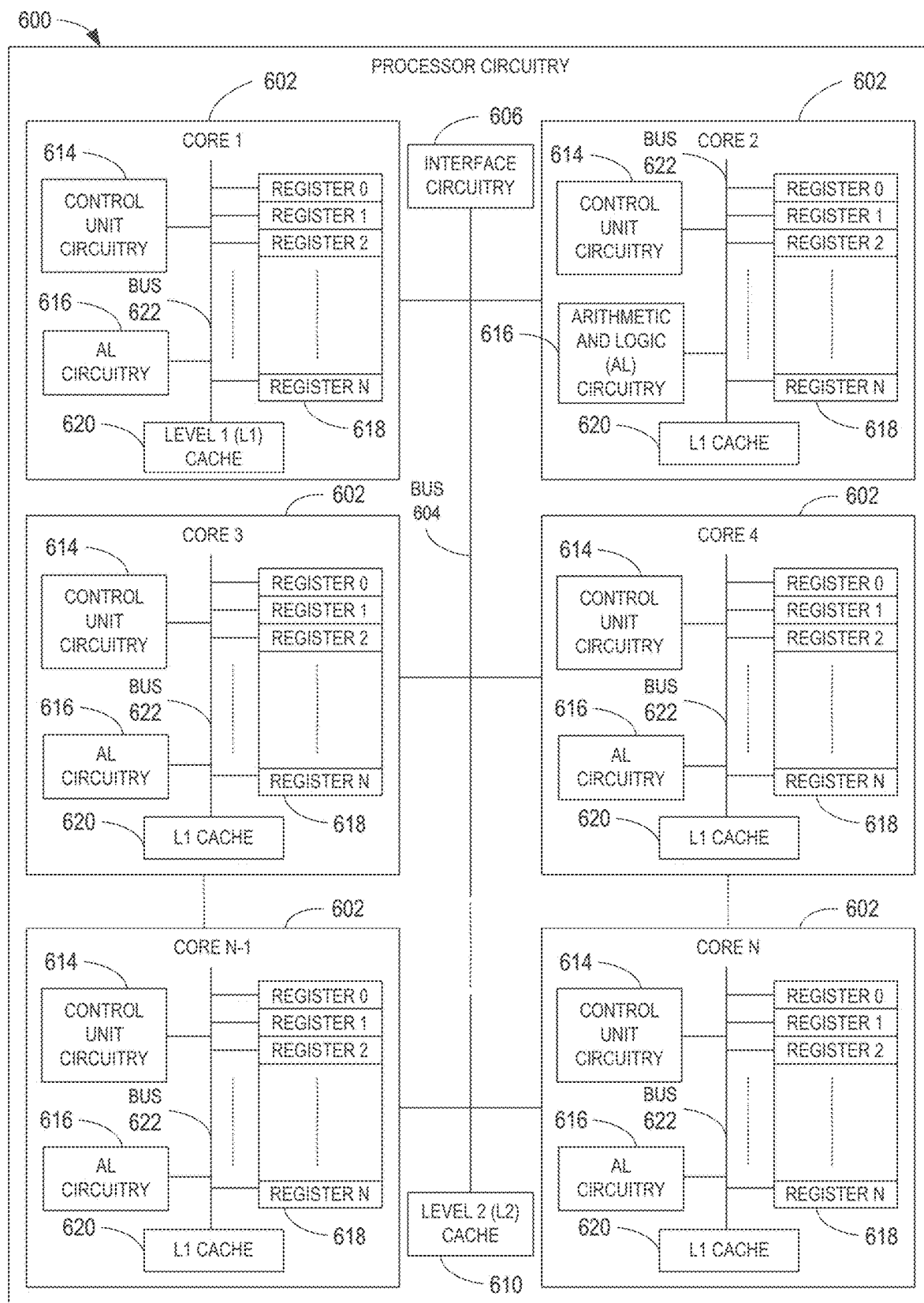
FIG. 6 is a block diagram of an example implementation of the processor circuitry of FIG. 4.

FIG. 6 is a block diagram of an example implementation of the processor circuitry 512 of FIG. 5. In this example, the processor circuitry 512 of FIG. 5 is implemented by a microprocessor 600. For example, the microprocessor _00 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 4.

The cores 602 may communicate by an example bus 604. In some examples, the bus 604 may implement a communication bus to effectuate communication associated with one(s) of the cores 602. For example, the bus 604 may implement at least one of an Inter-Integrated Circuit (I2C) bus, a Serial Peripheral Interface (SPI) bus, a PCI bus, or a PCIe bus. Additionally or alternatively, the bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2_cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the L1 cache 620, and an example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The bus 622 may implement at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
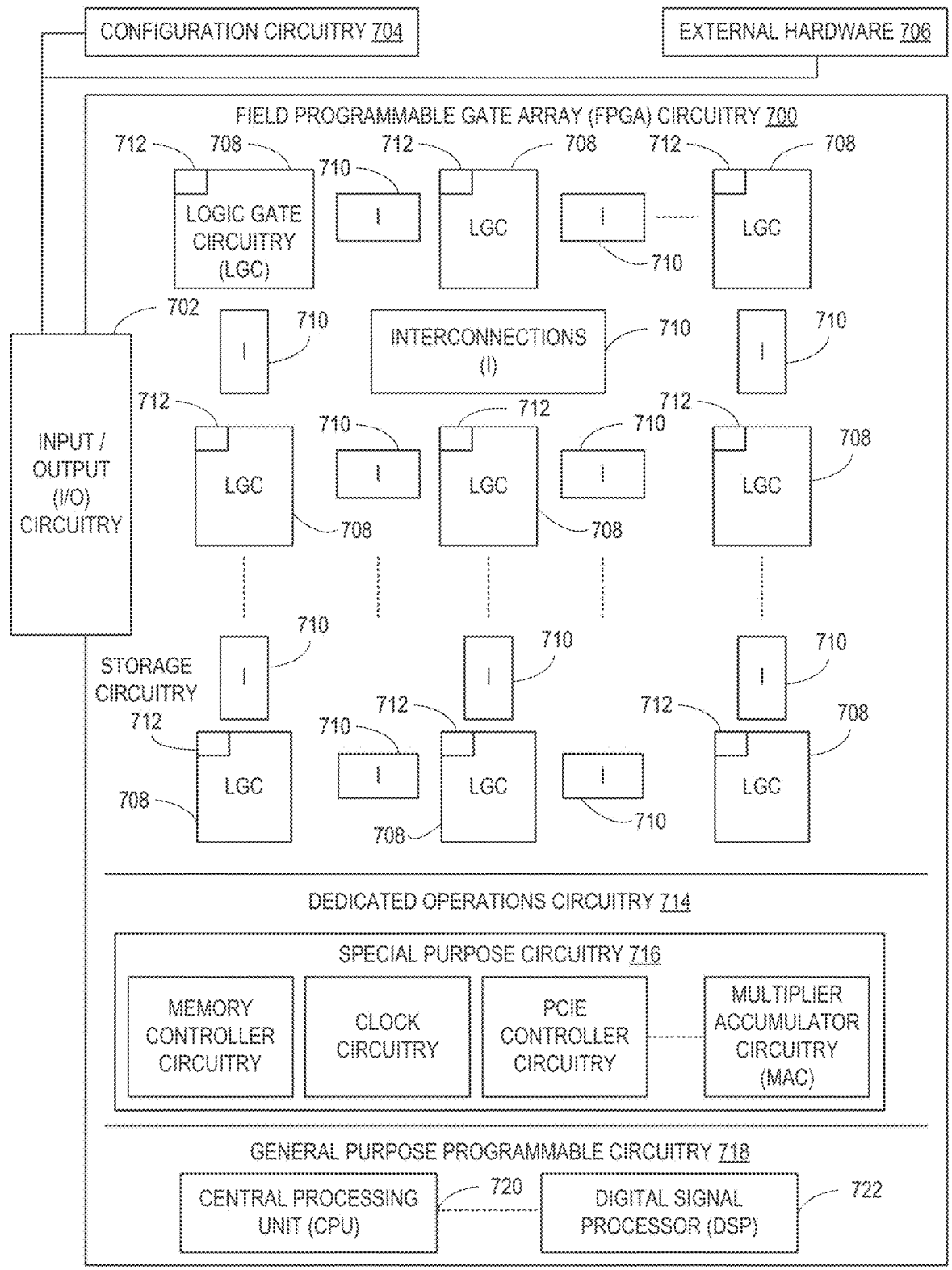
FIG. 7 is a block diagram of another example implementation of the processor circuitry of FIG. 4.

FIG. 7 is a block diagram of another example implementation of the processor circuitry 712 of FIG. 7. In this example, the processor circuitry 712 is implemented by FPGA circuitry 700. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowchart of FIG. 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowchart of FIG. 4. In particular, the FPGA_00 may be thought of as an array of logic gates, interconnections, and switches. The switches can be programmed to change how the logic gates are interconnected by the interconnections, effectively forming one or more dedicated logic circuits (unless and until the FPGA circuitry_00 is reprogrammed). The configured logic circuits enable the logic gates to cooperate in different ways to perform different operations on data received by input circuitry. Those operations may correspond to some or all of the software represented by the flowchart of FIG. 4. As such, the FPGA circuitry 700 may be structured to effectively instantiate some or all of the machine readable instructions of the flowchart of FIG. 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIG. 4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware (e.g., external hardware circuitry) 706. For example, the configuration circuitry 704 may implement interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware_06 may implement the microprocessor 600 of FIG. 5. The FPGA circuitry 700 also includes an array of example logic gate circuitry 708, a plurality of example configurable interconnections 710, and example storage circuitry 712. The logic gate circuitry 708 and interconnections 710 are configurable to instantiate one or more operations that may correspond to at least some of the machine readable instructions of FIG. 4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart of FIG. 4 may be executed by one or more of the cores 602 of FIG. 6 and a second portion of the machine readable instructions represented by the flowchart of FIG. 4 may be executed by the FPGA circuitry 700 of FIG. 7.

In some examples, the processor circuitry 512 of FIG. 5 may be in one or more packages. For example, the processor circuitry 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example methods, apparatus, systems, and articles of manufacture to use front load estimates for body control are disclosed herein. Further examples and combinations thereof include the following:

Example 1 includes an apparatus, comprising memory including stored instructions, and a processor to execute the instructions to filter sensor data to generate a first load value, the first load value associated with a first load on a front axle of a vehicle, generate, based on the first load value and a velocity of the vehicle, a first body control adjustment value, modify a body control output value with the first body control adjustment value, and apply the modified body control output value to a suspension system of the vehicle.

Example 2 includes the apparatus of example 1, wherein the processor executes the instructions to filter the sensor data to generate a second load value, the second load value associated with a second load on a rear axle of the vehicle, generate, based on the second load value and the velocity of the vehicle, a second body control adjustment value.

Example 3 includes the apparatus of example 2, wherein the processor executes the instructions to modify the body control output value by multiplying the body control output value by the first body control adjustment value and the second body control adjustment value.

Example 4 includes the apparatus of example 1, wherein the processor executes the instructions to generate the first body control adjustment value by using the first load value, the velocity of the vehicle, and a look-up table.

Example 5 includes the apparatus of example 4, wherein the look-up table includes a non-linear relationship between load values and body control adjustment values, the load values including the first load value and the body control adjustment values including the first body control adjustment value.

Example 6 includes the apparatus of example 4, wherein the processor executes the instructions to populate the look-up table based on a tuning preference of a user of the vehicle.

Example 7 includes the apparatus of example 1, wherein the velocity of the vehicle includes a sprung mass velocity of the vehicle in at least one of a heave direction, a pitch direction, or a roll direction.

Example 8 includes a non-transitory machine-readable storage medium including instructions which, when executed, cause a processor to filter sensor data to generate a first load value, the first load value associated with a first load on a front axle of a vehicle, generate, based on the first load value and a velocity of the vehicle, a first body control adjustment value, modify a body control output value with the first body control adjustment value, and apply the modified body control output value to a suspension system of the vehicle.

Example 9 includes the non-transitory machine-readable storage medium of example 8, wherein the instructions, when executed, further cause the processor to filter the sensor data to generate a second load value, the second load value associated with a second load on a rear axle of the vehicle, generate, based on the second load value and the velocity of the vehicle, a second body control adjustment value, and modify the body control output value with the second body control adjustment value.

Example 10 includes the non-transitory machine-readable storage medium of example 9, wherein the instructions, when executed, cause the processor to modify the body control output value by multiplying the body control output value by the first body control adjustment value and the second body control adjustment value.

Example 11 includes the non-transitory machine-readable storage medium of example 8, wherein the instructions, when executed, cause the processor to generate the first body control adjustment value by using the first load value, the velocity of the vehicle, and a look-up table.

Example 12 includes the non-transitory machine-readable storage medium of example 11, wherein the look-up table includes a non-linear relationship between load values and body control adjustment values, the load values including the first load value and the body control adjustment values including the first body control adjustment value.

Example 13 includes the non-transitory machine-readable storage medium of example 11, wherein the processor executes the instructions to populate the look-up table based on a tuning preference of a user of the vehicle.

Example 14 includes the non-transitory machine-readable storage medium of example 8, wherein the velocity of the vehicle includes a sprung mass velocity of the vehicle in at least one of a heave direction, a pitch direction, or a roll direction.

Example 15 includes a method, comprising filtering sensor data to generate a first load value, the first load value associated with a first load on a front axle of a vehicle, generating, based on the first load value and a velocity of the vehicle, a first body control adjustment value, modifying a body control output value with the first body control adjustment value, and applying the modified body control output value to a suspension system of the vehicle.

Example 16 includes the method of example 15, further including filtering the sensor data to generate a second load value, the second load value associated with a second load on a rear axle of the vehicle, generating, based on the second load value and the velocity of the vehicle, a second body control adjustment value, and modifying the body control output value with the second body control adjustment value.

Example 17 includes the method of example 16, wherein the modifying the body control output value includes multiplying the body control output value by the first body control adjustment value and the second body control adjustment value.

Example 18 includes the method of example 15, wherein the generating the first body control adjustment value includes using the first load value, the velocity of the vehicle, and a look-up table.

Example 19 includes the method of example 18, further including populating the look-up table based on a tuning preference of a user of the vehicle.

Example 20 includes the method of example 15, wherein the velocity of the vehicle includes a sprung mass velocity of the vehicle in at least one of a heave direction, a pitch direction, or a roll direction. The following claims are hereby incorporated into this Detailed Description by this reference, with each claim standing on its own as a separate embodiment of the present disclosure.

What is claimed is:

1. A non-transitory machine-readable storage medium including instructions which, when executed, cause a processor to:
   generate, based on a load on a front axle of a vehicle and a velocity of the vehicle, a body control adjustment;
   determine a modified body control output based on the body control adjustment and an unmodified body control output; and
   apply the modified body control output to a suspension element of the vehicle.

2. The non-transitory machine-readable storage medium of claim 1, wherein the velocity of the vehicle includes a sprung mass velocity of the vehicle in at least one of a heave direction, a pitch direction, or a roll direction.

3. The non-transitory machine-readable storage medium of claim 1, wherein the load is a first load, the body control adjustment is a first body control adjustment, and the instructions, when executed, further cause the processor to generate, based on a second load on a rear axle of the vehicle and the velocity, a second body control adjustment.

4. The non-transitory machine-readable storage medium of claim 3, wherein the instructions cause the processor to determine the modified body control output based on the second body control adjustment.

5. The non-transitory machine-readable storage medium of claim 1, wherein the instructions, when executed, cause the processor to generate the body control adjustment via a look-up table.

6. The non-transitory machine-readable storage medium of claim 5, wherein the look-up table includes a non-linear relationship between the load on the front axle and the body control adjustment.

7. The non-transitory machine-readable storage medium of claim 5, wherein the instructions, when executed, cause the processor to populate the look-up table based on a tuning preference input via a user interface of the vehicle.

8. A vehicle, comprising:
   a front axle;
   a suspension system including a suspension element; and
   a processor to execute instructions to:
      generate, based on a load on the front axle and a velocity of the vehicle, a body control adjustment;
      determine a modified body control output based on the body control adjustment and an unmodified body control output; and
      apply the modified body control output to the suspension element of the vehicle.

9. The vehicle of claim 8, wherein the velocity of the vehicle includes a sprung mass velocity of the vehicle in at least one of a heave direction, a pitch direction, or a roll direction.

10. The vehicle of claim 8, wherein the load is a first load, the body control adjustment is a first body control adjustment, and the processor executes the instructions to determine, based on a second load on a rear axle of the vehicle and the velocity, a second body control adjustment.

11. The vehicle of claim 10, wherein the processor executes the instructions to determine the modified body control output based on the second body control adjustment.

12. The vehicle of claim 8, the processor executes the instructions further to generate the body control adjustment via a look-up table.

13. The vehicle of claim 12, wherein the look-up table includes a non-linear relationship between the load on the front axle and the body control adjustment.

14. The vehicle of claim 12, the processor executes the instructions further to populate the look-up table based on a tuning preference input via a user interface of the vehicle.

15. An apparatus comprising:
   a suspension element; and
   a suspension controller to:
      generate, based on a load on a front axle of a vehicle and a velocity of the vehicle, a body control adjustment;

determine a modified body control output based on the body control adjustment and an unmodified body control output; and apply the modified body control output to the suspension element of the vehicle.

16. The apparatus of claim 15, wherein the velocity of the vehicle includes a sprung mass velocity of the vehicle in at least one of a heave direction, a pitch direction, or a roll direction.

17. The apparatus of claim 15, wherein the load is a first load, the body control adjustment is a first body control adjustment, and the suspension controller is further to determine, based on a second load on a rear axle of the vehicle and the velocity, a second body control adjustment.

18. The apparatus of claim 17, wherein the suspension controller is further to determine the modified body control output based on the second body control adjustment.

19. The apparatus of claim 15, the suspension controller is further to generate the body control adjustment via a look-up table.

20. The apparatus of claim 19, the suspension controller is further to populate the look-up table based on a tuning preference input via a user interface of the vehicle.

\* \* \* \* \*